(12) United States Patent
Ito et al.

(10) Patent No.: US 12,535,196 B2
(45) Date of Patent: Jan. 27, 2026

(54) PLANAR ILLUMINATION DEVICE

(71) Applicant: MINEBEA MITSUMI Inc., Nagano (JP)

(72) Inventors: Ginga Ito, Kitasaku-gun (JP); Suguru Mukumoto, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/563,488

(22) PCT Filed: Feb. 4, 2022

(86) PCT No.: PCT/JP2022/004402
§ 371 (c)(1),
(2) Date: Nov. 22, 2023

(87) PCT Pub. No.: WO2022/249557
PCT Pub. Date: Dec. 1, 2022

(65) Prior Publication Data
US 2024/0247777 A1    Jul. 25, 2024

(30) Foreign Application Priority Data
May 28, 2021    (JP) .................................. 2021-090023

(51) Int. Cl.
*F21V 5/00* (2018.01)
*F21V 5/04* (2006.01)
(Continued)

(52) U.S. Cl.
CPC .............. *F21V 5/007* (2013.01); *F21V 5/045* (2013.01); *F21V 7/0083* (2013.01); *F21Y 2105/10* (2016.08); *F21Y 2113/00* (2013.01)

(58) Field of Classification Search
CPC ......... F21V 5/007; F21V 5/045; F21V 7/0083
See application file for complete search history.

(56) References Cited

U.S. PATENT DOCUMENTS 10,267,486 B1 * 4/2019 Mao ...................... F21V 5/007
10,345,583 B2   7/2019 Tomaru
(Continued)

FOREIGN PATENT DOCUMENTS

CN    101641547 A    2/2010
JP    H09-15729 A    1/1997
(Continued)

OTHER PUBLICATIONS

International Preliminary Report on Patentability for corresponding International Application No. PCT/JP2022/004402 dated Sep. 13, 2022.
(Continued)

*Primary Examiner* — Bryon T Gyllstrom
(74) *Attorney, Agent, or Firm* — Chrisman Gallo Tochtrop LLC

(57) ABSTRACT

A planar illumination device of an embodiment includes a substrate, a first optical element, and a second optical element. A plurality of light sources are two dimensionally disposed at the substrate. The first optical element is disposed at an emission side of the plurality of light sources, and condenses light emitted from the plurality of light sources. The second optical element inclines a light distribution of the light condensed by the first optical element with respect to the first axial direction.

21 Claims, 13 Drawing Sheets

(51) Int. Cl.
  *F21V 7/00* (2006.01)
  *F21Y 105/10* (2016.01)
  *F21Y 113/00* (2016.01)

(56) References Cited

U.S. PATENT DOCUMENTS

| | | | |
|---|---|---|---|
| 10,838,255 B2 | 11/2020 | Gahagan et al. | |
| 11,155,285 B2* | 10/2021 | Beier | G08G 1/095 |
| 11,487,154 B2 | 11/2022 | Date et al. | |
| 2007/0147041 A1* | 6/2007 | Shiratsuchi | F21V 5/008 |
| | | | 362/268 |
| 2009/0257224 A1* | 10/2009 | Huang | F21V 19/04 |
| | | | 362/249.02 |
| 2011/0063850 A1 | 3/2011 | Oide | |
| 2011/0170293 A1* | 7/2011 | Murai | F21V 5/007 |
| | | | 362/244 |
| 2014/0071692 A1* | 3/2014 | Zhang | G02B 19/0061 |
| | | | 362/327 |
| 2014/0204592 A1* | 7/2014 | Miyashita | G02B 19/0028 |
| | | | 362/311.06 |
| 2015/0159828 A1* | 6/2015 | Joergensen | F21V 5/007 |
| | | | 362/235 |
| 2015/0159830 A1* | 6/2015 | Joergensen | F21V 5/007 |
| | | | 362/237 |
| 2015/0211708 A1* | 7/2015 | Stavely | G02B 3/0056 |
| | | | 362/231 |
| 2018/0267362 A1* | 9/2018 | Gahagan | G02F 1/133512 |
| 2018/0321489 A1* | 11/2018 | Tomaru | F21V 7/09 |
| 2021/0341792 A1* | 11/2021 | Date | F21S 2/00 |

FOREIGN PATENT DOCUMENTS

| | | |
|---|---|---|
| JP | 2002-221605 A | 8/2002 |
| JP | 2009-117195 A | 5/2009 |
| JP | 2010-153256 A | 7/2010 |
| JP | 2012-203092 A | 10/2012 |
| JP | 2012215895 A | 11/2012 |
| JP | 2013-037918 A | 2/2013 |
| JP | 2017-027706 A | 2/2017 |
| JP | 2017-531904 A | 10/2017 |
| JP | 2020-077589 A | 5/2020 |
| WO | 2017/090335 A1 | 6/2017 |

OTHER PUBLICATIONS

International Search Report for corresponding International Application No. PCT/JP2022/004402 mailed Mar. 29, 2022.
Written Opinion for corresponding International Application No. PCT/JP2022/004402 dated Mar. 29, 2022.
Notice of Reasons for Refusal mailed Jan. 4, 2023 for corresponding Japanese Application No. 2021-090023 and English translation.
Notice of Reasons for Refusal mailed May 23, 2023 for corresponding Japanese Application No. 2021-090023 and English translation.
EP22809318.3 Extended European Search Report Jun. 3, 2025.

* cited by examiner

[LONGITUDINAL CROSS SECTION]

[TRANSVERSE CROSS SECTION]

[LONGITUDINAL CROSS SECTION]

[TRANSVERSE CROSS SECTION]

PLANAR ILLUMINATION DEVICE

CROSS REFERENCE TO RELATED APPLICATIONS

This application is a national stage entry of International Application No. PCT/JP2022/004402, filed on Feb. 4, 2022, which claims priority to Japanese Patent Application 2021-090023, filed on May 28, 2021, which is incorporated herein by reference.

TECHNICAL FIELD

The disclosure relates to a planar illumination device.

BACKGROUND

In a planar illumination device used as a backlight of a liquid crystal display device, various optical lenses are used in order to realize light distribution characteristics according to applications (for example, see JP 2002-221605 A and JP 2012-203092 A).

SUMMARY

As characteristics of a backlight of a liquid crystal display device, special light distribution characteristics such as inclination of an optical axis have been required together with high luminance and high efficiency. However, in the conventional device, it is difficult to efficiently control a light distribution with respect to a required visual field range while ensuring high luminance.

The disclosure has been made in view of the above, and an object of the disclosure is to provide a planar illumination device capable of achieving required light distribution characteristics while ensuring high luminance.

To solve the above descried issue and achieve the object, a planar illumination device according to an aspect of the disclosure includes a substrate, a first optical element, and a second optical element. A plurality of light sources are two dimensionally disposed at the substrate. The first optical element is disposed at an emission side of the plurality of light sources and condenses light emitted from the plurality of light sources. The second optical element inclines a light distribution of the light condensed by the first optical element with respect to the first axial direction.

The planar illumination device according to an aspect of the disclosure can achieve required light distribution characteristics while ensuring high luminance.

DESCRIPTION OF EMBODIMENTS

Figure 1:
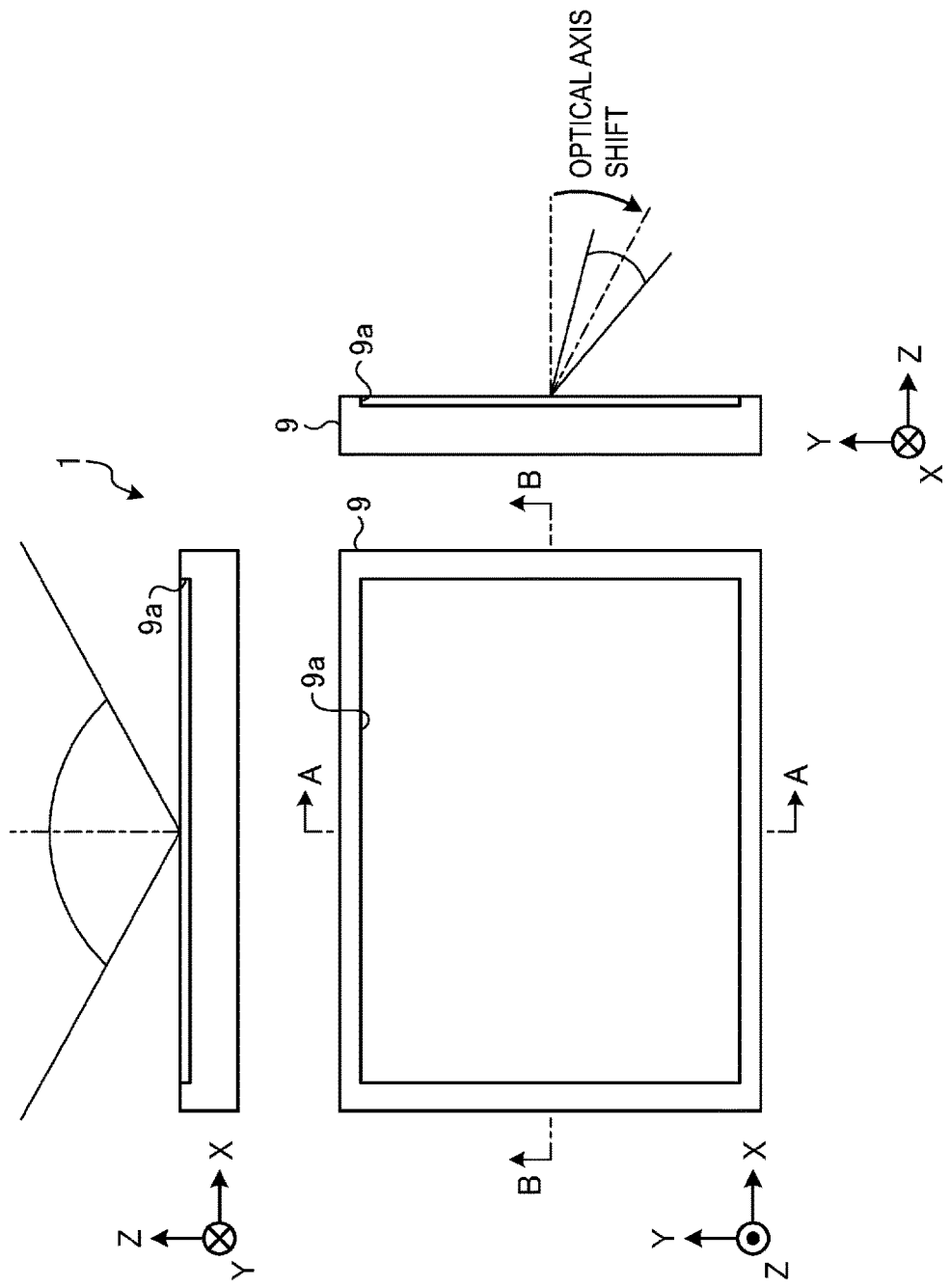
FIG. 1 is a view for explaining light distribution characteristics required for a planar illumination device according to an embodiment.

A planar illumination device according to an embodiment is described below with reference to the drawings. Further, the disclosure is not limited to the embodiment. Furthermore, the dimensional relationships between elements, proportions of the elements, and the like in the drawings may differ from reality. The drawings may include parts having mutually different dimensional relationships and proportions. Furthermore, the contents described in one embodiment or modification examples are applied in principle to other embodiments or modification examples.

Embodiment

FIG. 1 is a view for explaining light distribution characteristics required for a planar illumination device 1 according to the embodiment. FIG. 1 is an external view of the planar illumination device 1 according to the embodiment, and in FIG. 1, for convenience, a light emitting surface of the planar illumination device 1 is in an X-Y plane, and a thickness direction of the planar illumination device 1 is a Z direction.

In FIG. 1, the planar illumination device 1 has a substantially rectangular plate-shaped outer shape, and light is emitted from the inside of an opening 9a of a frame 9. Note that the outer shape of the planar illumination device 1 is not limited to the rectangular plate shape illustrated in the drawing. The "optical axis shift" illustrated in the figure means inclination of the optical axis.

In the example illustrated in FIG. 1, the optical axis is inclined to the negative direction side of the Y-axis of the planar illumination device 1 (obliquely lower right in the drawing), and it is illustrated that a narrow visual field range is required. On the other hand, in the example illustrated in FIG. 1, as the light distribution characteristics in the X-axis direction of the planar illumination device 1, a wide visual field range is required with the normal direction of the light emitting surface as the optical axis.

Thus, the planar illumination device 1 includes a first optical element that condenses light emitted from the light source, and a second optical element that inclines a light distribution of the light condensed by the first optical element with respect to the Y-axis direction. The Y-axis direction is an example of a first axial direction. The embodiment can also be applied to a case where the first axial direction is the X-axis direction. Hereinafter, a configuration example of the planar illumination device 1 of the embodiment will be described in detail.

Figure 2:
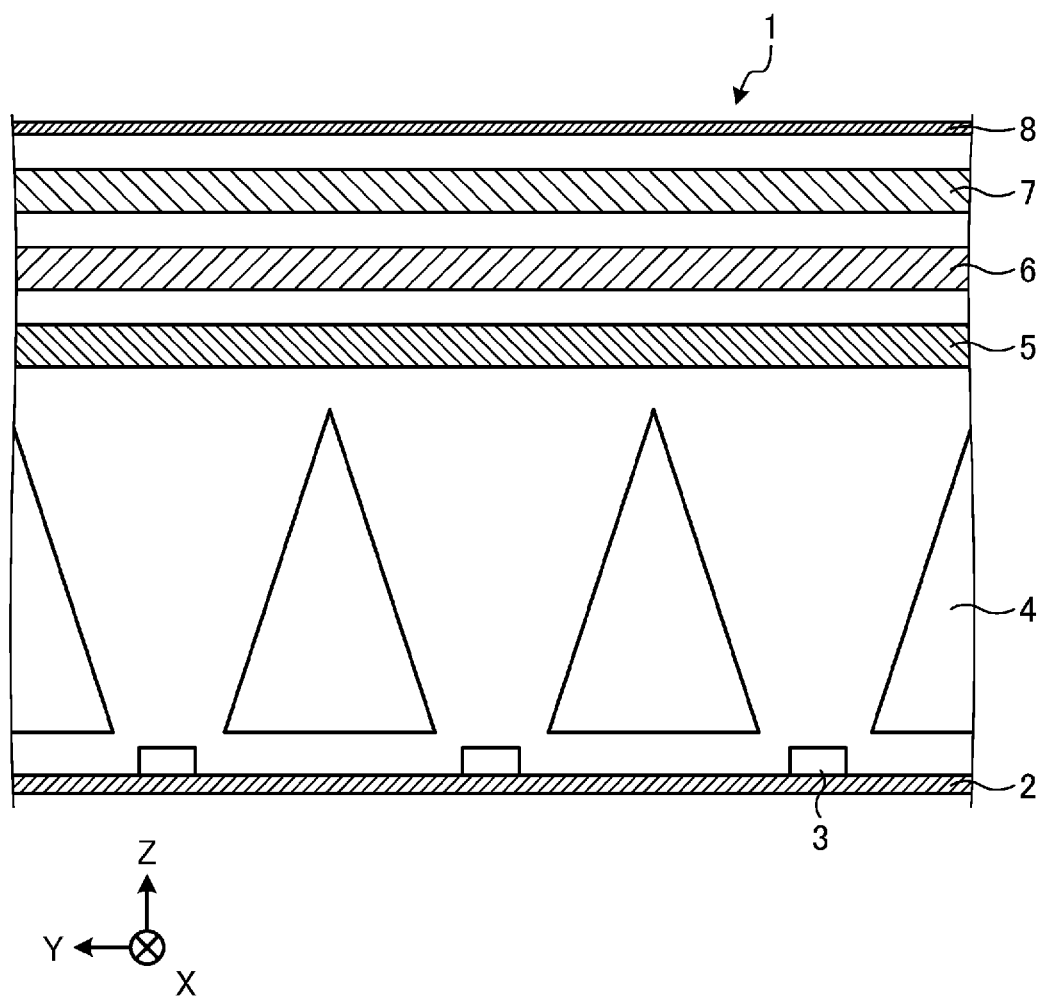
FIG. 2 is a view for explaining an outline of the planar illumination device illustrated in FIG. 1.

FIG. 2 is a view for explaining an outline of the planar illumination device illustrated in FIG. 1. FIG. 2 is a simplified A-A cross-sectional view of the planar illumination device 1 illustrated in FIG. 1. In FIG. 2, the frame 9 is omitted. Hereinafter, the A-A cross-sectional view may be referred to as a longitudinal cross-sectional view. Further, a B-B cross-sectional view of the planar illumination device 1 illustrated in FIG. 1 may be referred to as a transverse cross-sectional view.

In FIG. 2, a plurality of light sources 3 such as light emitting diodes (LEDs) are disposed at a substrate 2. In FIG. 2, the disposed plurality of light sources 3 are illustrated in the Y-axis direction, but the plurality of light sources 3 are also disposed in the X-axis direction (see FIG. 4 described below). That is, the plurality of light sources 3 are two dimensionally disposed at the substrate 2. Each of the plurality of light sources 3 is individually driven, and can cope with so-called local dimming.

A condenser lens 5 provided with a first optical element for condensing the light emitted from the plurality of light sources 3 is disposed at the emission side of the plurality of light sources 3, and a light distribution lens 6 provided with a second optical element for inclining the light distribution of the light condensed by the condenser lens 5 with respect to the Y-axis direction is disposed. The condenser lens 5 and the light distribution lens 6 will be described with reference to FIGS. 3 and 4.

Figure 3:
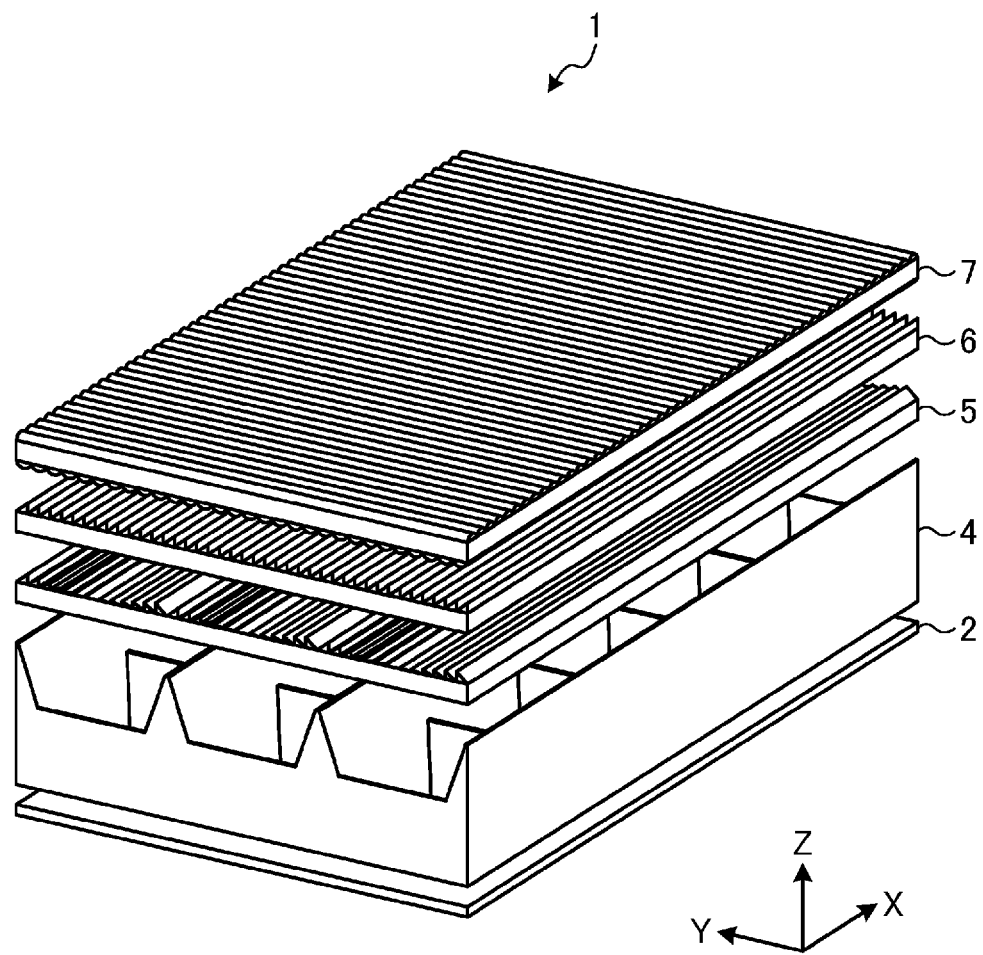
FIG. 3 is a perspective view schematically illustrating a configuration of the planar illumination device illustrated in FIG. 1.
Figure 4:
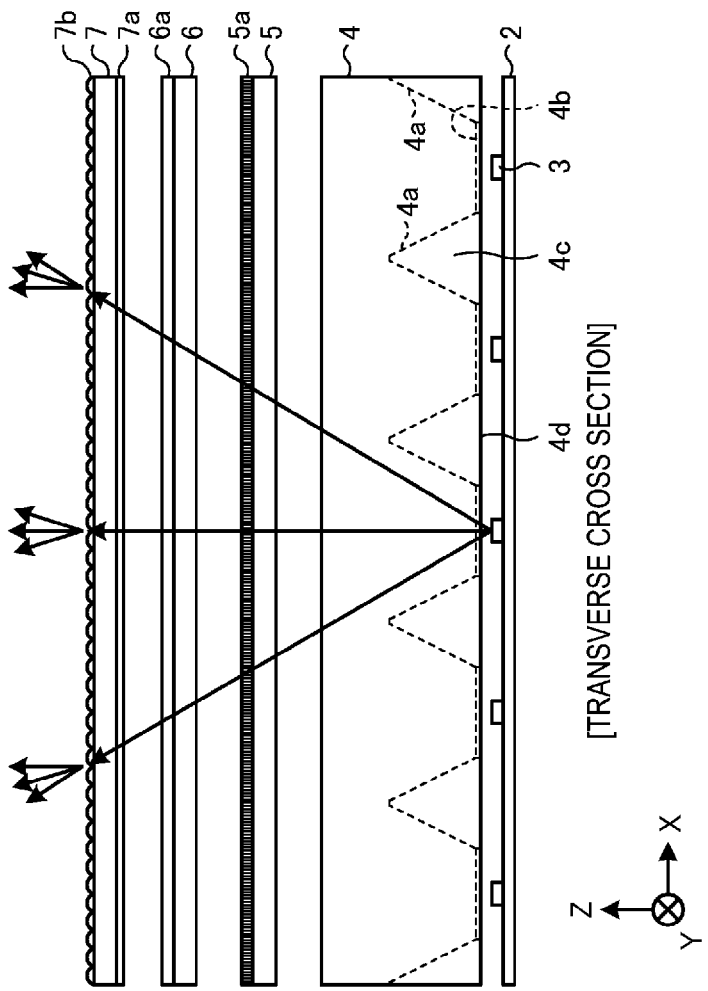
FIG. 4 is an A-A cross-sectional view and a B-B cross-sectional view of the planar illumination device illustrated in FIG. 1.
Figure 4:
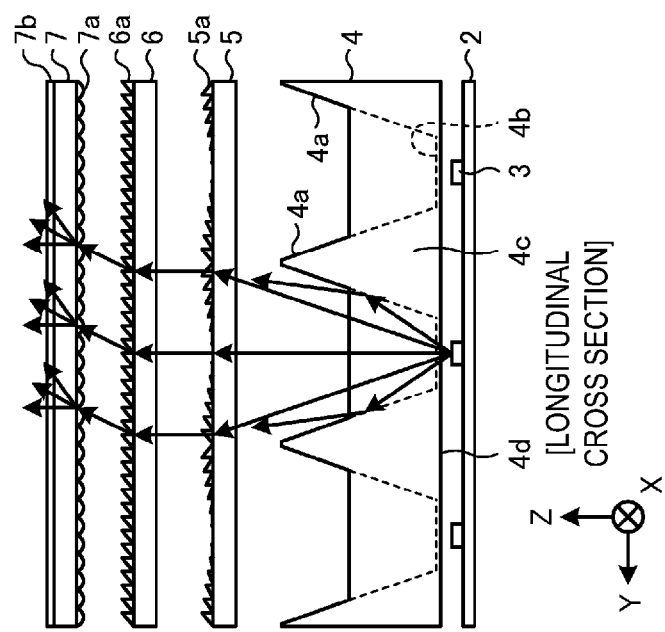

FIG. 3 is a perspective view schematically illustrating the planar illumination device 1 illustrated in FIG. 1, and FIG. 4 is an A-A cross-sectional view and a B-B cross-sectional view of the planar illumination device illustrated in FIG. 1. The left drawing of FIG. 4, an A-A cross-sectional view, is a longitudinal cross-sectional view, and the right drawing of FIG. 4, a B-B cross-sectional view, is a transverse cross-sectional view. The longitudinal cross-sectional view of FIG. 4 schematically illustrates the behavior of the light beam in the Y-axis direction, and the transverse cross-sectional view of FIG. 4 schematically illustrates the behavior of the light beam in the X-axis direction.

The condenser lens 5 extends in the X-axis direction orthogonal to the Y-axis direction, and includes, as a first optical element, a linear Fresnel lens 5a condensing light emitted from the plurality of light sources 3 in the Y-axis direction. The linear Fresnel lens 5a is provided at the surface opposite to the surface opposing the substrate 2 (the emission side surface of the condenser lens 5). The X-axis direction is an example of a second axial direction.

The linear Fresnel lens 5a has a prism structure such that a cylindrical convex lens is used as a Fresnel lens, and has a groove extending in the X-axis direction. In the linear Fresnel lens 5a, grooves are periodically formed in accordance with the pitch (the pitch in the Y-axis direction) of the light sources 3 disposed directly below.

The light distribution lens 6 has a linear prism 6a extending in the X-axis direction as a second optical element for inclining the light distribution of the light condensed by the condenser lens 5 with respect to the Y-axis direction. The linear prism 6a is provided at the surface opposite to the surface opposing the condenser lens 5 (the emission side surface of the light distribution lens 6). The linear prism 6a has a substantially triangular prism structure extending in the X-axis direction, and is continuously disposed in the Y-axis direction. As a result, a groove extending in the X-axis direction is formed at the emission side surface of the light distribution lens 6. The cross-sectional shape of the Y-Z plane of the linear prism 6a is a triangle, and the base angle of the side connecting the vertex and the point on the positive direction side of the Y-axis of the base is smaller than the base angle of the side connecting the vertex and the point on the negative direction side of the Y-axis of the base.

In the longitudinal cross-sectional view of FIG. 4, the light emitted from the light source 3 enters the condenser lens 5, is refracted by the linear Fresnel lens 5a provided at the upper surface of the condenser lens 5, and is emitted as substantially parallel light. In the longitudinal cross-sectional view of FIG. 4, the parallel light emitted from the condenser lens 5 enters the light distribution lens 6, and is emitted with the optical axis being inclined by the linear prism 6a provided at the upper surface of the light distribution lens 6.

On the other hand, in the transverse cross-sectional view of FIG. 4, the light emitted from the light source 3 enters the condenser lens 5, and is emitted without being substantially refracted by the linear Fresnel lens 5a provided at the upper surface of the condenser lens 5. In the transverse cross-sectional view of FIG. 4, the light emitted from the condenser lens 5 enters the light distribution lens 6, and is emitted without being substantially refracted by the linear prism 6a provided at the upper surface of the light distribution lens 6.

In this manner, with respect to the Y-axis direction, the condenser lens 5 condenses the light emitted from the plurality of light sources 3 and causes the light to efficiently enter the light distribution lens 6 as substantially parallel light, and the light distribution lens 6 causes the light to be emitted with the optical axis of the incident light inclined. As a result, the planar illumination device 1 can realize the required light distribution characteristics with high luminance. In the embodiment, it is not necessary to shift the optical axis in the X-axis direction, and it is not necessary to condense the light emitted from the plurality of light sources 3 in the X-axis direction since the required visual field range is relatively wide. For this reason, the condenser lens 5 of the embodiment is not provided with a linear Fresnel lens extending in the Y-axis direction, and the light distribution lens 6 is not provided with a linear prism extending in the Y-axis direction. The effect of such a configuration will be described in detail below.

Further, in the planar illumination device 1 according to the embodiment, as illustrated in FIGS. 2, 3, and 4, the visual field range adjustment lens 7 is disposed at the emission side of the light distribution lens 6 in order to adjust the light emitted from the light distribution lens 6 to a required visual field range. As illustrated in FIG. 4, the visual field range adjustment lens 7 includes a first lenticular lens 7a provided at a surface opposing the light distribution lens 6 (a surface on the incident side), and a second lenticular lens 7b provided at a surface opposite to the surface opposing the light distribution lens 6 (a surface on the emission side).

The first lenticular lens 7a extends in the X-axis direction and adjusts the visual field range in the Y-axis direction. The first lenticular lens 7a has a semi-cylindrical type fine prism structure extending in the X-axis direction. The second lenticular lens 7b extends in the Y-axis direction and adjusts the luminance distribution in the X-axis direction. The second lenticular lens 7b has a semi-cylindrical type fine prism structure extending in the Y-axis direction.

As described above, in the embodiment, it is possible to control the light distribution to the target visual field range while ensuring high luminance and uniformity by combining the linear Fresnel lens for condensing light, the linear prism for inclining the light to the target optical axis, and the lenticular lens for adjusting the visual field range and the luminance distribution by condensing and diffusing the light.

Although not illustrated in FIGS. 3 and 4, the planar illumination device 1 may have a diffusion sheet 8 disposed at the emission side of the visual field range adjustment lens 7 as illustrated in FIG. 2. The diffusion sheet 8 is useful for eliminating striped unevenness or the like caused by the first lenticular lens 7a and the second lenticular lens 7b.

As illustrated in FIGS. 2, 3, and 4, the planar illumination device 1 is a direct-type backlight, and the reflector 4 is disposed between the plurality of light sources 3 and the condenser lens 5 in order to cause the light emitted by the plurality of light sources 3 to efficiently enter the condenser lens 5. As illustrated in FIG. 4, the reflector 4 is formed such that openings 4b respectively corresponding to the plurality of light sources 3 are disposed, and has a wall part 4c such that a wall surface surrounding the opening 4b serves as a reflecting surface 4a. In the embodiment, the reflector 4 has four reflecting surfaces 4a surrounding the openings 4b.

The planar illumination device 1 of the embodiment is required to have the visual field characteristics of a wide visual field in the X-axis direction and a narrow visual field in the Y-axis direction. In the embodiment described above, such visual field characteristics are realized mainly by controlling the optical characteristics by the lens function of the condenser lens 5, the light distribution lens 6, the visual field range adjustment lens 7, and the like described above. However, depending on the structure of the reflector 4 located between the light source 3 and the lens, the visual field characteristics obtained through the lens may change. Thus, it is preferable to match the structure of the reflector 4 to the required characteristics in order to ensure the light distribution control to the target visual field range realized by the above-described lens function.

Figure 5:
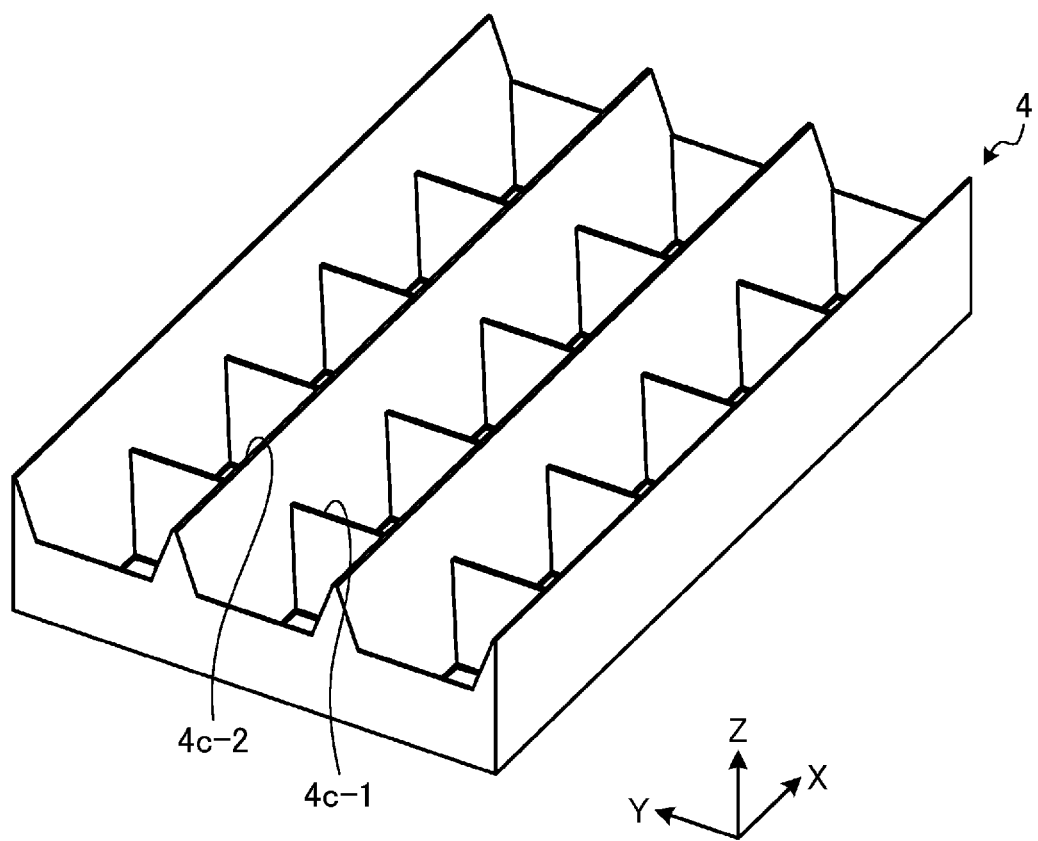
FIG. 5 is a perspective view of a reflector illustrated in FIG. 3.
Figure 6:
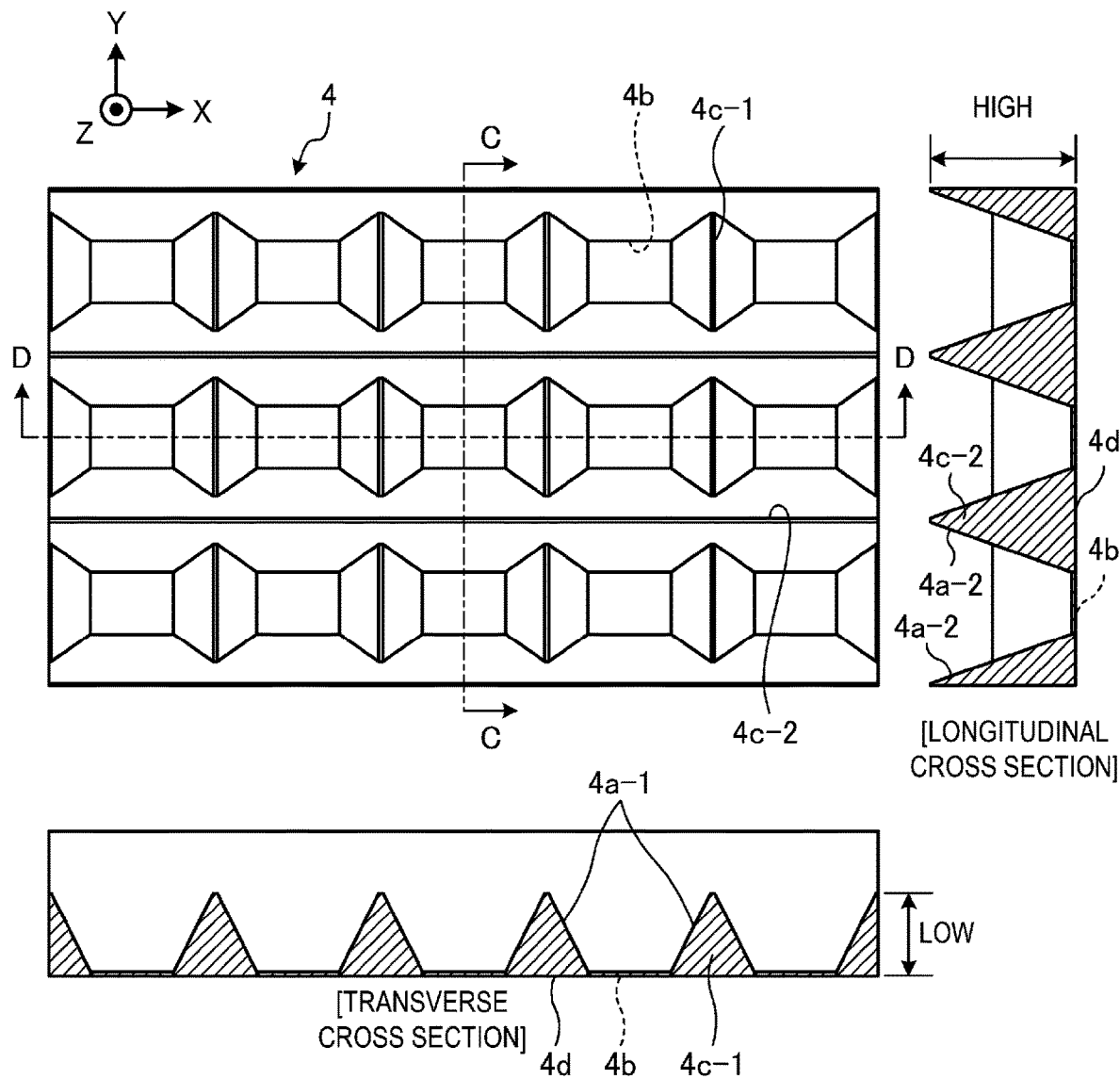
FIG. 6 is a front view, a C-C cross-sectional view, and a D-D cross-sectional view of the reflector illustrated in FIG. 3.

The structure of the reflector according to the embodiment will be described below with reference to FIGS. 5 and 6. FIG. 5 is a perspective view of the reflector illustrated in FIG. 3, and FIG. 6 is a front view, a C-C cross-sectional view (longitudinal cross section), and a D-D cross-sectional view (transverse cross section) of the reflector illustrated in FIG. 3.

The wall part 4c has a shape such that a plurality of first wall parts 4c-1 extending in the Y-axis direction and a plurality of second wall parts 4c-2 extending in the X-axis direction are assembled in a lattice shape. The wall part 4c is assembled such that the bottom surface of the first wall parts 4c-1 and the bottom surface of the second wall parts 4c-2 are flush with each other. The reflecting surface 4a is a wall surface of the wall part 4c. The two reflecting surfaces 4a-1 opposing each other between the two first wall parts 4c-1 adjacent to each other in the X-axis direction are inclined to be separated from each other toward the Z-axis positive direction. In addition, two reflecting surfaces 4a-2 opposing each other between two second wall parts 4c-2 adjacent to each other in the Y-axis direction are inclined to be separated from each other toward the Z-axis positive direction. The reflector 4 is formed of, for example, a white resin or the like in order to enhance a reflection effect. The reflector 4 of the embodiment is a molded article formed by injection molding.

The height of the first wall part 4c-1 is defined by the visual field range in the X-axis direction, and the height of the second wall part 4c-2 is defined by the visual field range in the Y-axis direction. In the embodiment, since the narrow visual field characteristics are required in the Y-axis direction, the height of the second wall part 4c-2 is increased as illustrated in the longitudinal cross section of FIG. 6. By increasing the height of the second wall part 4c-2, the widely distributed light component from the light source 3 can be reflected by the reflecting surface 4a-2 and condensed at the linear Fresnel lens 5a of the segment corresponding to the light source 3.

Increasing the height of the second wall part 4c-2 also serves to block light entering the linear Fresnel lens 5a of the adjacent segment, thereby avoiding the occurrence of unintended light distribution.

On the other hand, in the embodiment, since wide visual field characteristics are required in the X-axis direction, as illustrated in the transverse cross section of FIG. 6, the wide light distribution component from the light source 3 is used without being blocked by reducing the height of the first wall part 4c-1. In the embodiment, the height of the second wall part 4c-2 extending in the X-axis direction (longitudinal direction) is greater than the height of the first wall part 4c-1 extending in the Y-axis direction (lateral direction).

As illustrated in FIG. 4, the reflector 4 of the embodiment is disposed such that the opening 4b is located at the emission side with respect to the light emitting surface of the light source 3. The light emitting surface of the light source 3 corresponds to the upper surface of the light source 3. In other words, as illustrated in FIG. 4, the bottom surface 4d of the wall part 4c of the reflector 4 is disposed in a state of being floated from the substrate 2 to be located at a position higher than the light emitting surface of the light source 3.

In the embodiment, only the uniaxial linear Fresnel lens 5a extending in the longitudinal direction (X-axis direction) of the substrate 2 is employed in order to condense light only in the lateral direction (Y-axis direction) of the substrate 2. As a result, in the embodiment, the lens misalignment in the long-side direction can be ignored. In the embodiment, in the visual field range adjustment lens 7, the lenticular lenses are provided in both the X-axis direction and the Y-axis direction. However, since the lenticular lenses have the same shape pattern, it is not necessary to take the lens position deviation into account.

When the reflector 4 is grounded to the substrate 2, the wall part 4c of the reflector 4 and the light source 3 are close to each other, and the reflector 4 and the light source 3 may interfere with each other when the reflector 4 and the light source 3 expand and contract. On the other hand, in the embodiment, since the opening 4b of the reflector 4 is disposed at a position higher than the light emitting surface of the light source 3, even if the reflector 4 and the light source 3 expand and contract, there is no possibility of contact between the wall part 4c of the reflector 4 and the light source 3.

Since the interval between the light sources 3 is narrow, when the bottom surface 4d of the reflector 4 is disposed at the substrate 2, the size of the bottom surface 4d cannot be increased, thus it is difficult to increase the height of the wall part 4c of the reflector 4 from the viewpoint of moldability of injection molding. On the other hand, in the embodiment, the size of the opening 4b of the reflector 4 can be made smaller than the outer periphery of the light source 3 as long as the opening 4b is larger than the light emitting surface of the light source 3 in the top view. That is, in the embodiment, the size of the opening 4b can be reduced. In other words, in the embodiment, the size of the bottom surface 4d can be increased, and as a result, the height of the wall part 4c of the reflector 4 formed by injection molding can be increased. For this reason, in the embodiment, it is possible to obtain effects of high contrast at the time of local dimming and removal of unnecessary light distribution.

Modification Example

The planar illumination device 1 described in the above embodiment is merely an example, and various modifications can be made. Hereinafter, modification examples of the planar illumination device 1 will be described.

First Modification Example

The planar illumination device 1 of the first modification example has the same prism structure (the linear Fresnel lens 5a, the linear prism 6a, the first lenticular lens 7a, and the second lenticular lens 7b) as the structure of the embodiment, but the arrangement of each prism structure is different from the arrangement of the embodiment.

Figure 7:
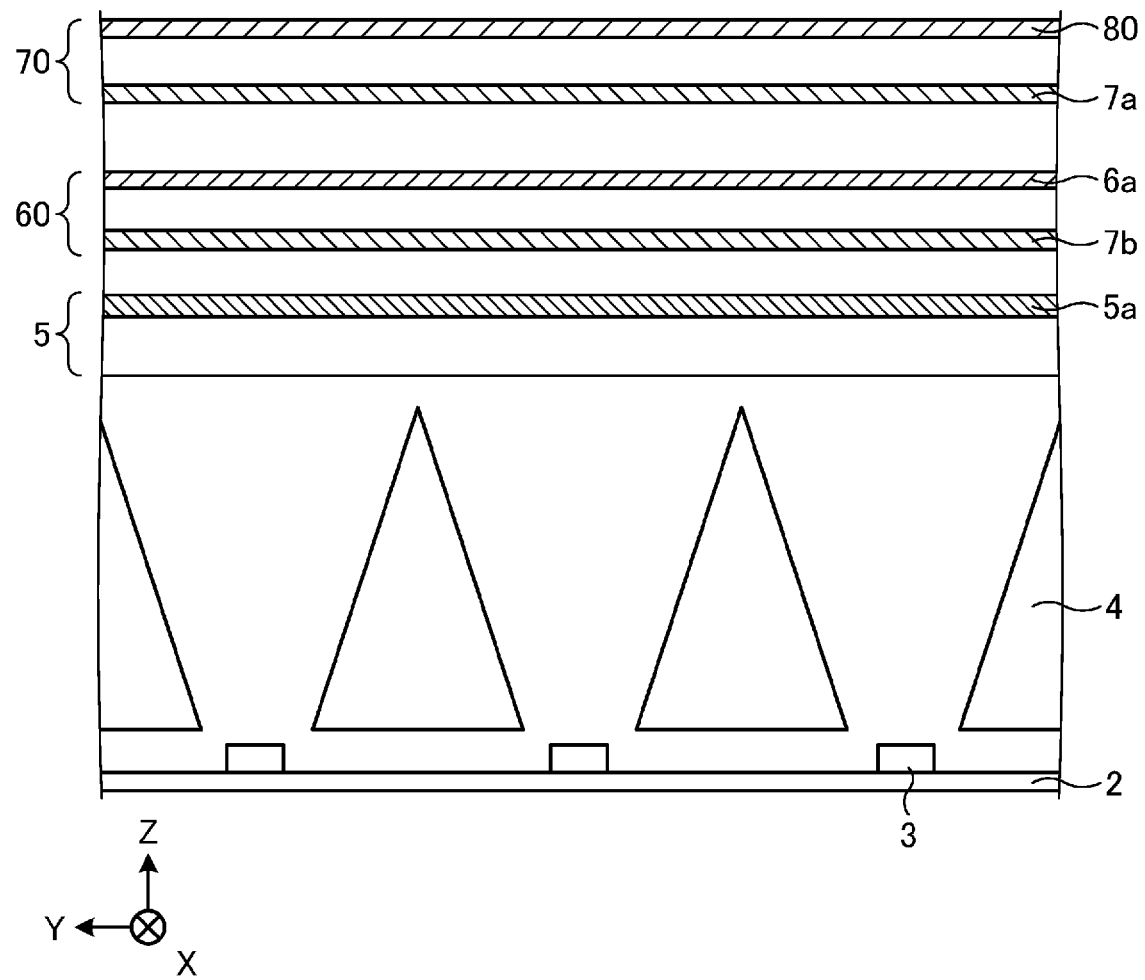
FIG. 7 is a view for explaining a first modification example.

FIG. 7 is a view for explaining the first modification example. First, the planar illumination device 1 of the first modification example includes, as a first lens, the condenser lens 5 such that the linear Fresnel lens 5a is provided at the surface opposite to the surface opposing the substrate 2, as a first lens, as in the embodiment. The planar illumination device 1 of the first modification example includes a second lens 60 and a third lens 70.

In the second lens 60, the second lenticular lens 7b is provided at a surface opposing the first lens (the condenser lens 5), and a linear prism 6a extending in the X-axis direction is provided at a surface opposite to the surface opposing the first lens (the condenser lens 5). In the third lens 70, the first lenticular lens 7a is provided at a surface opposing the second lens 60.

In the first modification example, in the Y-axis direction, the light emitted from the light source 3 is condensed at the emission surface of the light distribution lens 5 (first lens) and becomes substantially parallel light, the optical axis is inclined at the emission surface of the second lens 60, and the visual field range is adjusted on the incident surface of the third lens 70. In the first modification example, the luminance distribution of the light emitted from the light source 3 is adjusted by the incident surface of the second lens 60 in the X-axis direction. Even in such a configuration order of the lenses, as in the embodiment, it is possible to realize the required light distribution characteristics while ensuring high luminance.

In the third lens 70, a diffusion surface 80 is formed at a surface opposite to a surface opposing the second lens 60. In the first modification example, since the second lenticular lens 7b is provided at the lens having the linear prism 6a, the diffusion surface 80 having the same function as the diffusion sheet 8 can be formed at the upper surface of the third lens 70, and the number of components can be reduced.

Second Modification Example

The planar illumination device 1 of the second modification example has the same prism structure (the linear Fresnel lens 5a, the linear prism 6a, the first lenticular lens 7a, and the second lenticular lens 7b) as the structure of the embodiment, but the arrangement of each prism structures and the number of lenses are different from those of the embodiment.

Figure 8:
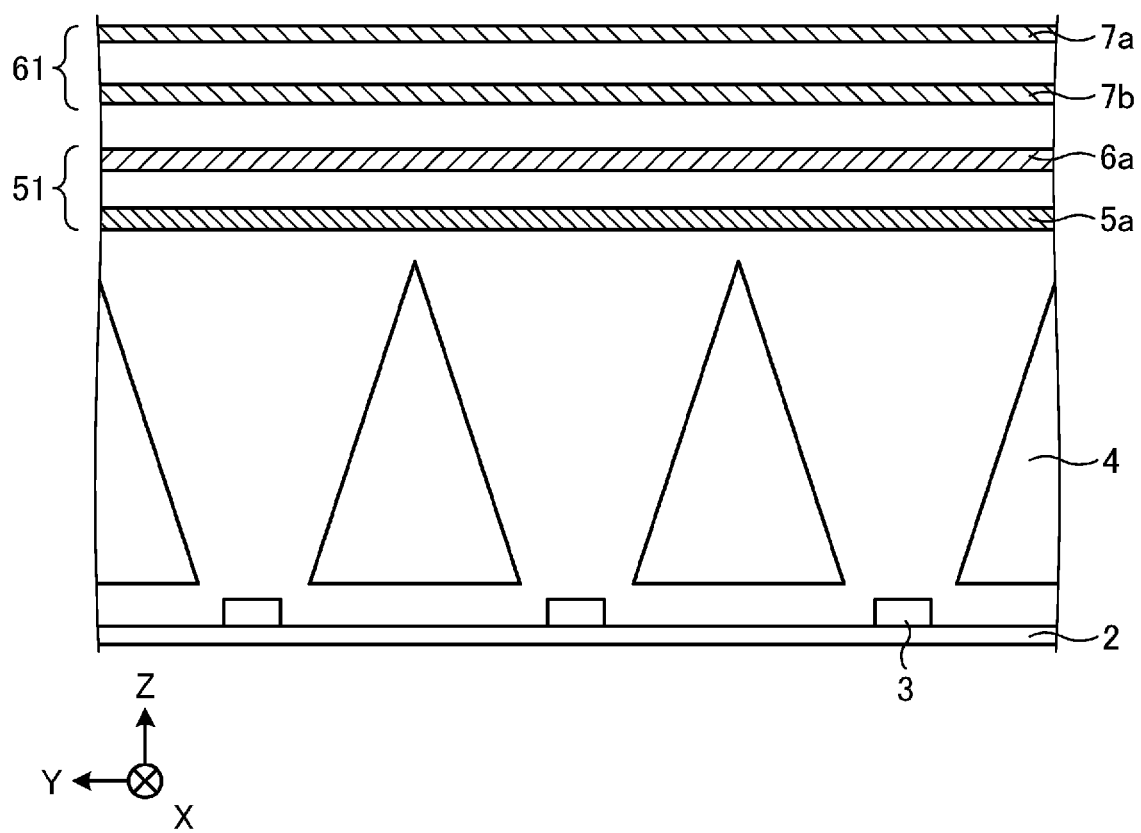
FIG. 8 is a view for explaining a second modification example.

FIG. 8 is a view for explaining the second modification example. The planar illumination device 1 of the second modification example includes a first lens 51 and a second lens 61. In the first lens 51, the linear Fresnel lens 5a is provided at a surface opposing the substrate 2, and the linear prism 6a is provided at a surface opposite to the surface opposing the substrate 2. In addition, the second lens 61 is disposed at the emission side of the first lens 51, the second lenticular lens 7b is provided at the surface opposing the first lens, and the first lenticular lens 7a is provided at the surface opposite to the surface opposing the first lens 51.

In the second modification example, in the Y-axis direction, the light emitted from the light source 3 is condensed at the incident surface of the first lens 51 and becomes substantially parallel light, the optical axis is inclined at the emission surface of the first lens 51, and the visual field range is adjusted on the emission surface of the second lens 61. On the other hand, in the second modification example, the luminance distribution of the light emitted from the light source 3 is adjusted by the incident surface of the second lens 61 in the X-axis direction. Even in such a configuration order of the lenses, as in the embodiment, it is possible to realize the required light distribution characteristics while ensuring high luminance.

Third Modification Example

The planar illumination device 1 of the third modification example is constituted by two lenses as in the second modification example, and has prisms (the linear Fresnel lens 5a, the first lenticular lens 7a, and the second lenticular lens 7b) similar to the prisms of the embodiment, but the shape of the linear prism for shifting the optical axis is different from the shape of the linear prism 6a.

Figure 9:
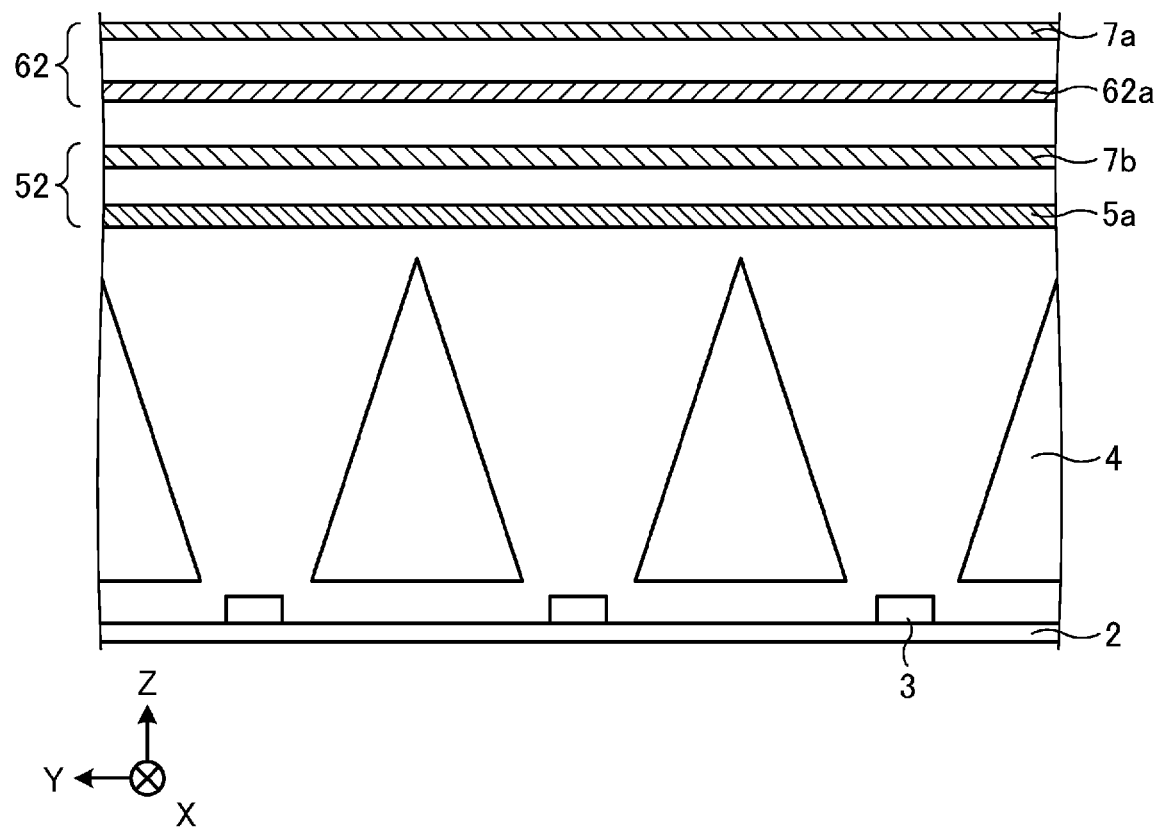
FIG. 9 is a view for explaining a third modification example.

FIG. 9 is a view for explaining the third modification example. The planar illumination device 1 of the third modification example includes a first lens 52 and a second lens 62. In the first lens 52, the linear Fresnel lens 5a is provided at a surface opposing the substrate 2, and the second lenticular lens 7b is provided at a surface opposite to the surface opposing the substrate 2. Further, the second lens 62 has a linear prism 62a extending in the X-axis direction as a second optical element, the linear prism 62a is provided at a surface opposing the first lens 52, and the first lenticular lens 7a is provided at a surface opposite to the surface opposing the first lens 52.

The linear prism 62a has a substantially triangular prism structure extending in the X-axis direction, and is continuously disposed in the Y-axis direction. The cross-sectional shape of the Y-Z plane of the linear prism 62a is an inverted triangle, and the base angle of the side connecting the vertex and the point on the positive direction side of the Y-axis of the base is greater than the base angle of the side connecting the vertex and the point on the negative direction side of the Y-axis of the base.

In the third modification example, in the Y-axis direction, the light emitted from the light source 3 is condensed at the incident surface of the first lens 52 and becomes substantially parallel light, the optical axis is inclined at the incident surface of the second lens 62, and the visual field range is adjusted on the emission surface of the second lens 62. On the other hand, in the third modification example, the luminance distribution of the light emitted from the light source 3 is adjusted by the emission surface of the first lens 52 in the X-axis direction. Even in such a configuration order of the lenses, as in the embodiment, it is possible to realize the required light distribution characteristics while ensuring high luminance.

Note that the lens configuration is not limited to Modification Examples 1 to 3 described above. For example, in the first lens 52, the second lenticular lens 7b may be provided at the incident surface, and the linear Fresnel lens 5a may be provided at the emission surface. Although the bottom surface of the reflector 4 is disposed at a position higher than the light emitting surface of the light source 3 in the above-described embodiment and Modification Examples 1 to 3, the bottom surface of the reflector 4 may be grounded to the substrate 2 as long as interference between the reflector 4 and the light source 3 can be avoided and the visual field range can be adjusted.

Fourth Modification Example

Figure 10:
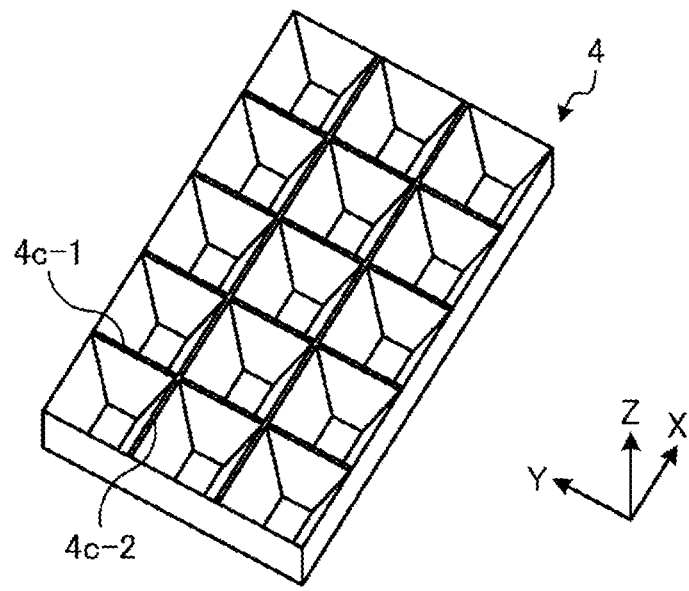
FIG. 10 is a view for explaining a fourth modification example.
Figure 10:
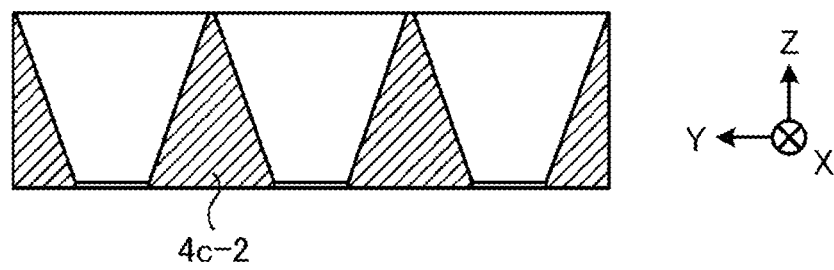
Figure 10:
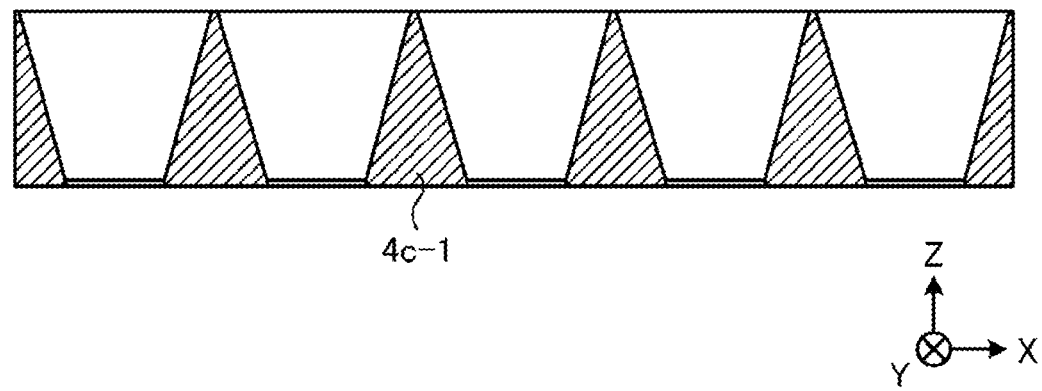

In the fourth modification example, a modification example of the reflector will be described. FIG. 10 is a view for explaining the fourth modification example. As described above, the height of the first wall part 4c-1 is adjusted in accordance with the visual field range in the X-axis direction, and the height of the second wall part 4c-2 is adjusted in accordance with the visual field range in the Y-axis direction. In the fourth modification example illustrated in FIG. 10, since the Y-axis direction and the X-axis direction have the same degree of narrow visual field range, the height of the first wall part 4c-1 and the height of the second wall part 4c-2 are the same.

Fifth Modification Example

Figure 11:
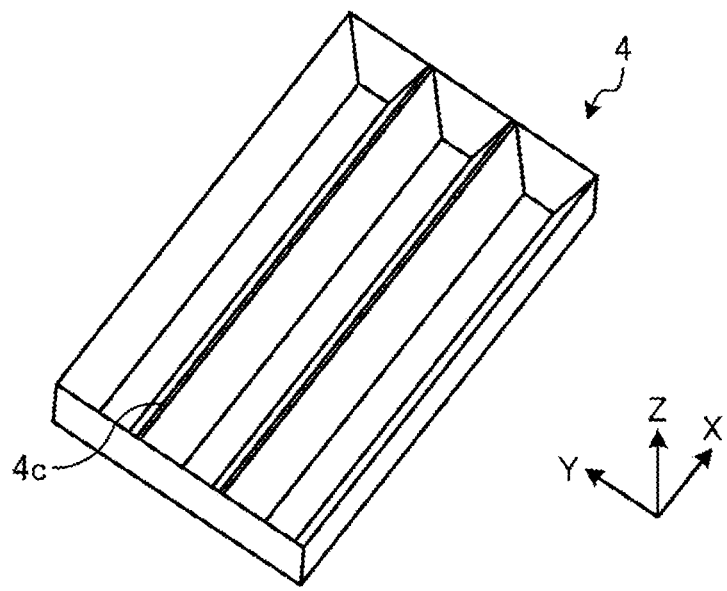
FIG. 11 is a view for explaining a fifth modification example.
Figure 11:
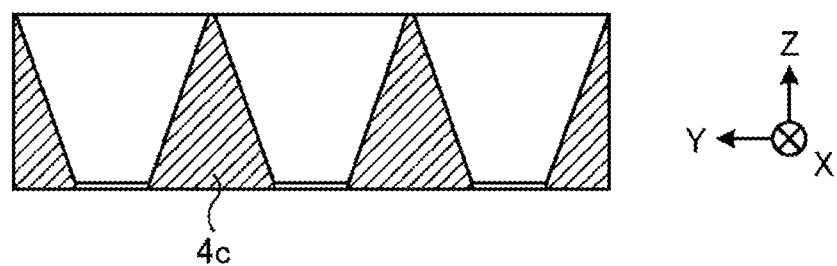
Figure 11:
Figure 11:
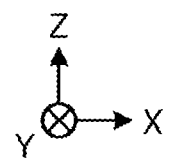

Also in the fifth modification example, a modification example of the reflector will be described. FIG. 11 is a view for explaining the fifth modification example. As illustrated in FIG. 11, the fifth modification example has a reflector structure such that a reflecting surface extending in the Y-axis direction is not provided between adjacent light sources 3 in the X-axis direction, and the X-axis direction is a direction for a wide visual field.

That is, as illustrated in FIG. 11, the wall part 4c extends in the X-axis direction, and the plurality of wall parts 4c are disposed along the Y-axis direction in accordance with the intervals of the plurality of light sources 3 disposed in the Y-axis direction. The height of the wall part 4c is defined by the visual field range in the Y-axis direction.

Sixth Modification Example

Figure 12:
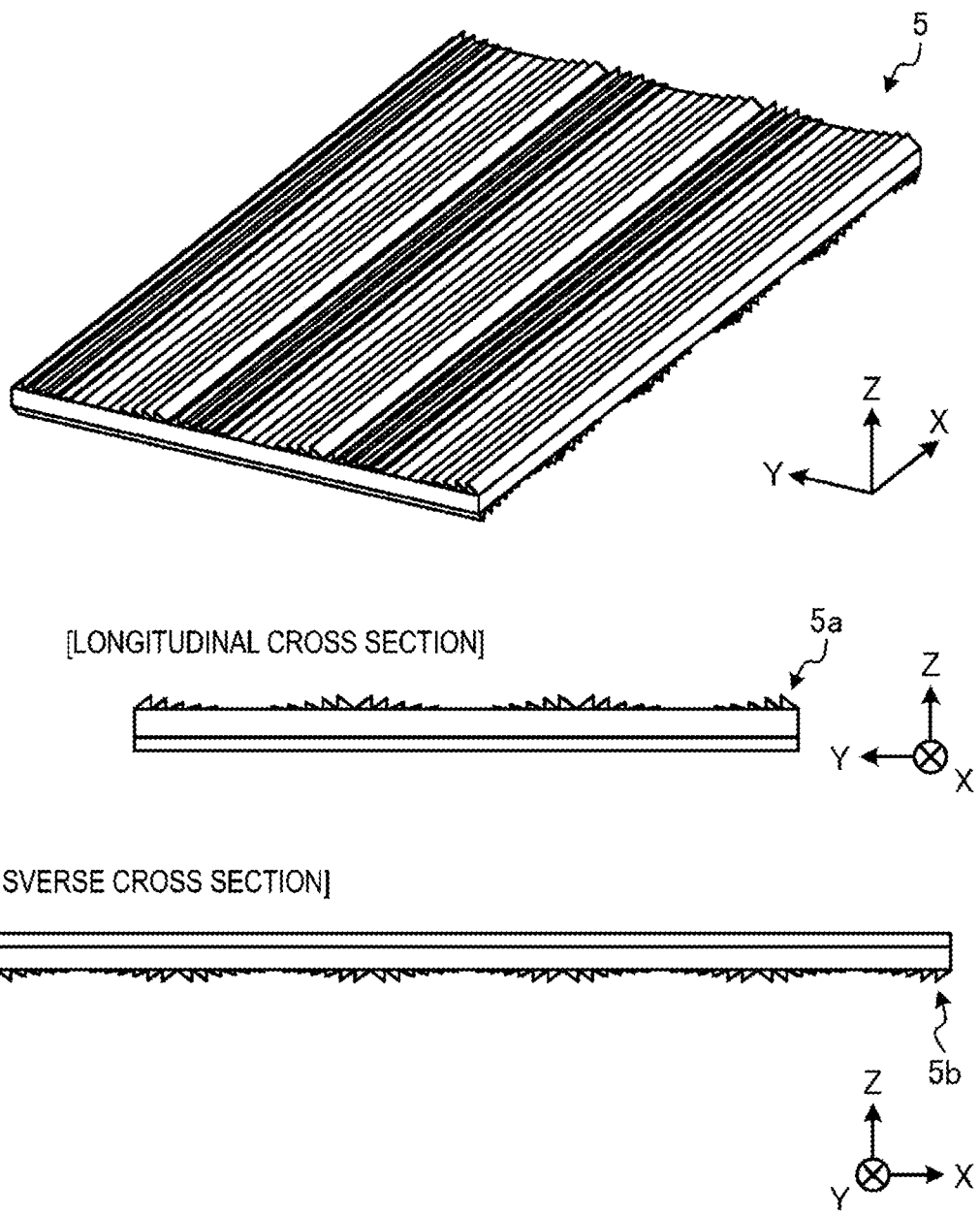
FIG. 12 is a view for explaining a sixth modification example.

In the sixth modification example, a modification example of the condenser lens 5 described in the embodiment will be described. FIG. 12 is a view for explaining the sixth modification example. In the above description, only light condensation in the Y-axis direction of the substrate 2 is performed, but light condensation in the X-axis direction of the substrate 2 may also be performed as long as the required light distribution characteristics can be realized.

As illustrated in FIG. 12, the sixth modification example has, as the first optical element, the linear Fresnel lens 5a extending in the X-axis direction and condensing light in the Y-axis direction, the linear Fresnel lens 5a being a first linear Fresnel lens, and the second linear Fresnel lens 5b extending in the Y-axis direction and condensing light in the X-axis direction. The second linear Fresnel lens 5b has a prism structure such that a cylindrical convex lens is used as a Fresnel lens, and has a groove extending in the Y-axis direction. In the second linear Fresnel lens 5b, grooves are periodically formed in accordance with the pitch in the X-axis direction of the light sources 3 disposed directly below. In the condenser lens 5 of the sixth modification example illustrated in FIG. 12, the second linear Fresnel lens 5b is provided at the incident side, and the first linear Fresnel lens 5a is provided at the emission side, but the arrangement may be reversed.

Seventh Modification Example

Figure 13:
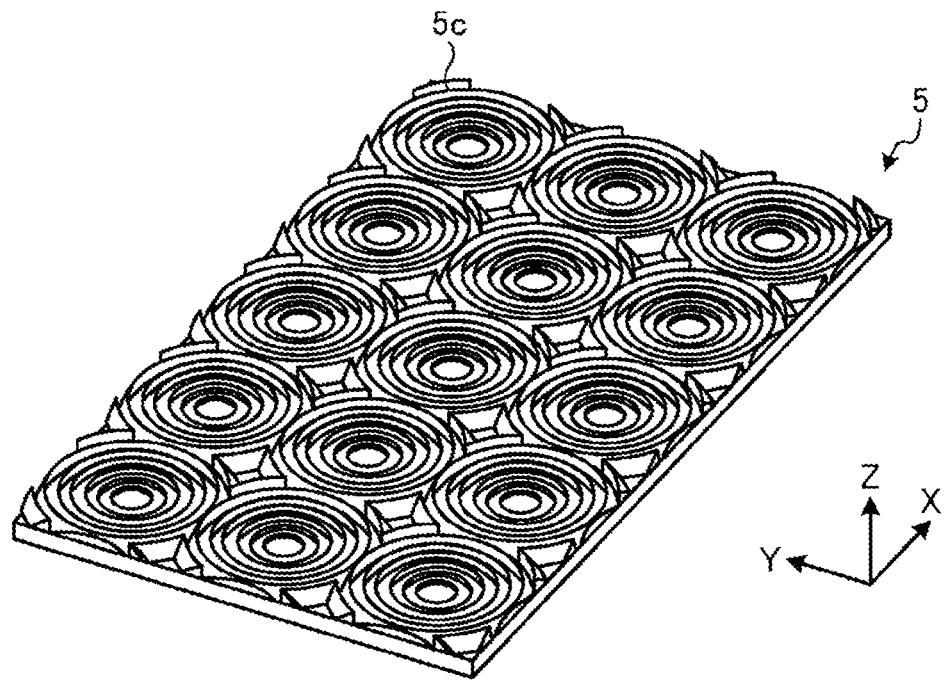
FIG. 13 is a view for explaining a seventh modification example.
Figure 13:
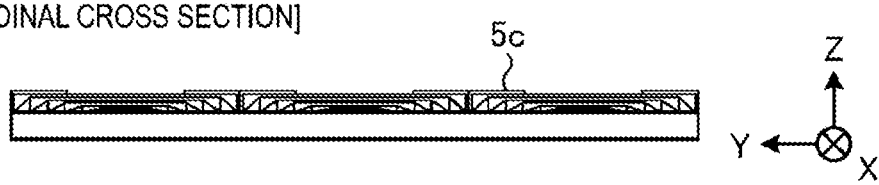
Figure 13:
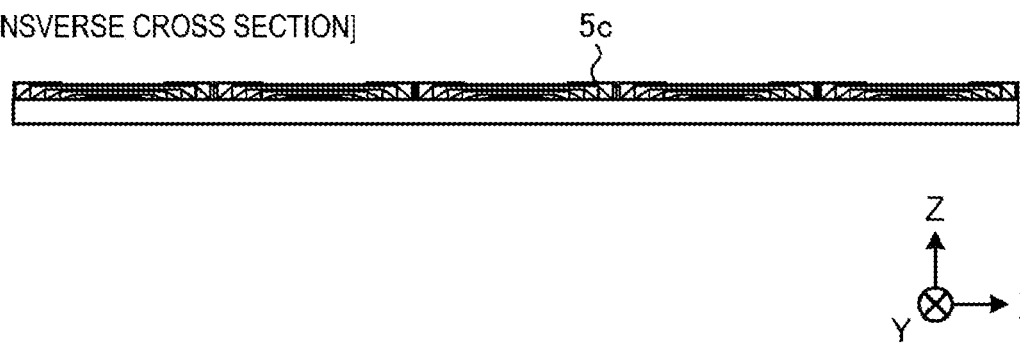

In the seventh modification example, a description will be given for a modification example of the condenser lens 5 having a prism structure different from the structure of the sixth modification example and condensing light in both the Y-axis direction and the X-axis direction. In the seventh modification example, as illustrated in FIG. 13, a concentric Fresnel lens 5c for condensing light in the Y-axis direction and the X-axis direction is provided as the first optical element. The concentric Fresnel lens 5c is a lens obtained by dividing a convex lens into concentric regions and thinning the regions, and has a saw-tooth cross section. The number of the concentric Fresnel lenses 5c provided corresponds to the number of the light sources 3 disposed directly below. In the condenser lens 5 of the seventh modification example illustrated in FIG. 13, the concentric Fresnel lens 5c is provided at the emission side, but may be provided at the incident side.

In the above-described embodiment and modification examples, in order to realize the required light distribution characteristics, the light distribution control by the prisms such as the linear Fresnel lens 5a, the first lenticular lens 7a, and the second lenticular lens 7b and the light distribution control by the height of the wall of the reflector 4 are combined, but the configuration is not limited to this. As long as the required light distribution characteristics are realized, only the light distribution control by the prism may be performed, or only the light distribution control by the height of the wall of the reflector 4 may be performed.

The disclosure is not limited by the embodiment described above. A configuration obtained by appropriately combining the above-mentioned constituent elements is also included in the disclosure. Further effects and modification examples can be easily derived by a person skilled in the art. Thus, a wide range of aspects of the disclosure is not limited to the embodiment described above and may be modified variously.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A planar illumination device comprising:
   a substrate including a plurality of light sources being two dimensionally disposed;
   a first optical element disposed at an emission side of the plurality of light sources, and configured to condense light emitted from the plurality of light sources; and
   a second optical element configured to incline, with respect to a first axial direction, a light distribution of the light condensed by the first optical element,
   wherein the first optical element includes a linear Fresnel lens extending in a second axial direction orthogonal to the first axial direction, and condenses light emitted from the plurality of light sources in the first axial direction, and
   wherein the first optical element includes a plurality of linear Fresnel lens periodically formed in the first axial direction and extending in the second axial direction, each of the linear Fresnel lens being configured to condense light emitted from the plurality of light sources by each line along the second axial direction.

2. The planar illumination device according to claim 1, further comprising:

a first lenticular lens extending in the second axial direction orthogonal to the first axial direction, and configured to adjust a visual field range in the first axial direction; and a second lenticular lens extending in the first axial direction, and configured to adjust a luminance distribution.

3. The planar illumination device according to claim 2, comprising:

a condenser lens including, as the first optical element, the linear Fresnel lens configured to condense light emitted from the plurality of light sources in the first axial direction, the linear Fresnel lens being provided at a surface opposite to a surface opposing the substrate;

a light distribution lens including, as the second optical element, a linear prism extending in the second axial direction, the linear prism being provided at a surface opposite to a surface opposing the condenser lens; and a visual field range adjustment lens disposed at an emission side of the light distribution lens, the first lenticular lens being provided at a surface opposing the light distribution lens, the second lenticular lens being provided at a surface opposite to a surface opposing the light distribution lens.

4. The planar illumination device according to claim 3, further comprising a diffusion sheet disposed at an emission side of the visual field range adjustment lens.

5. The planar illumination device according to claim 2, comprising:

a first lens including, as the first optical element, the linear Fresnel configured to condense light emitted from the plurality of light sources in the first axial direction, the linear Fresnel lens being provided at a surface opposite to a surface opposing the substrate;

a second lens including the second lenticular lens being provided at a surface opposing the first lens, and a linear prism extending in the second axial direction provided as the second optical element on a surface opposite to a surface opposing the first lens; and a third lens including the first lenticular lens provided at a surface opposing the second lens.

6. The planar illumination device according to claim 5, wherein the third lens has a diffusion surface formed at a surface opposite to a surface opposing the second lens.

7. The planar illumination device according to claim 2, comprising:

a first lens including the linear Fresnel lens configured to condense light emitted from the plurality of light sources in the first axial direction as the first optical element and a linear prism extending in the second axial direction as the second optical element, the linear Fresnel lens being provided at a surface opposing the substrate, the linear prism being provided at a surface opposite to the surface opposing the substrate; and a second lens disposed at an emission side of the first lens, the second lenticular lens being provided at a surface opposing the first lens, the first lenticular lens being provided at a surface opposite to the surface opposing the first lens.

8. The planar illumination device according to claim 2, comprising:

a first lens including, as the first optical element, the linear Fresnel lens configured to condense light emitted from the plurality of light sources in the first axial direction, the linear Fresnel lens being provided at a surface opposing the substrate, the second lenticular lens being provided at a surface opposite to the surface opposing the substrate; and a second lens including, as the second optical element, a linear prism extending in the second axial direction, the linear prism being provided at a surface opposing the first lens, the first lenticular lens being provided at a surface opposite to the surface opposing the first lens.

9. The planar illumination device according to claim 2, comprising, as the first optical element, the first linear Fresnel lens configured to condense light in the first axial direction, and a second linear Fresnel lens extending in the first axial direction and configured to condense light in the second axial direction.

10. The planar illumination device according to claim 1, comprising:

a reflector formed such that openings corresponding to the plurality of light sources are arranged, the reflector including a wall part such that a wall surface surrounding the opening serves as a reflecting surface, wherein the wall part has a shape such that a plurality of first wall parts extending in the first axial direction and a plurality of second wall parts extending in the second axial direction orthogonal to the first axial direction are assembled in a lattice shape, heights of the plurality of first wall parts are defined by a visual field range with respect to the second axial direction, and heights of the plurality of second wall parts are defined by a visual field range with respect to the first axial direction.

11. The planar illumination device according to claim 1, wherein the second optical element is a linear prism.

12. The planar illumination device according to claim 1, wherein each of the plurality of light sources is individually driven.

13. A planar illumination device comprising:

a substrate including a plurality of light sources being two dimensionally disposed; and a reflector formed such that openings corresponding to the plurality of light sources are arranged, the reflector including a wall part having a wall surface surrounding the openings serves as a reflecting surface, wherein the wall part has a shape such that a plurality of first wall parts extending in a first axial direction and a plurality of second wall parts extending in a second axial direction orthogonal to the first axial direction are assembled in a lattice shape, a height of the second wall part is greater than a height of the first wall part.

14. The planar illumination device according to claim 13, wherein each of the first wall parts is disposed between two adjacent light sources in the first axial direction, and each of the second wall parts is disposed between two adjacent light sources in the second axial direction.

15. The planar illumination device according to claim 13, comprising:

a plurality of first optical elements disposed at an emission side of the plurality of light sources and extending in a second axial direction orthogonal to the first axial direction, the first optical elements being periodically formed in the first axial direction, and each of the first optical elements is configured to condense light emitted from the plurality of light sources by each line along the second axial direction orthogonal to the first axial direction.

16. The planar illumination device according to claim 13, wherein
heights of the plurality of first wall parts are defined by a visual field range with respect to the second axial direction, and
heights of the plurality of second wall parts are defined by a visual field range with respect to the first axial direction.

17. A planar illumination device used as a backlight of a liquid crystal display device comprising:
a substrate including a plurality of light sources being two dimensionally disposed, the light sources being disposed both in a first axial direction and in a second axial direction orthogonal to the first axial direction,
a plurality of first optical elements disposed at an emission side of the plurality of light sources, and configured to condense light emitted from the plurality of light sources, wherein the first optical elements are periodically formed in the first axial direction, each of the first optical elements being configured to condense light emitted from the plurality of light sources by each line along at least the second axial direction, and
a second optical element configured to emit the light condensed by the first optical element with an advancing direction inclined to the same side with respect to at least a first axial direction.

18. The planar illumination device according to claim 17, comprising, as the first optical element, a first linear Fresnel lens configured to condense light in the first axial direction, and a second linear Fresnel lens extending in the first axial direction and configured to condense light in the second axial direction.

19. A planar illumination device comprising:
a substrate including a plurality of light sources being two dimensionally disposed;
a first optical element disposed at an emission side of the plurality of light sources, and configured to condense light emitted from the plurality of light sources; and
a second optical element configured to incline, with respect to a first axial direction, a light distribution of the light condensed by the first optical element, wherein
the first optical element includes a linear Fresnel lens extending in a second axial direction orthogonal to the first axial direction, and condenses light emitted from the plurality of light sources in the first axial direction,
the first optical element refracts light emitted from the plurality of light sources in the first axial direction without inclining-being substantially refracted in the second axial direction, and emits the refracted light as substantially parallel light, and
the linear Fresnel lens are periodically formed in accordance with the pitch of the light sources disposed directly below in the first axial direction.

20. The planar illumination device according to claim 19, wherein the second optical element is a linear prism.

21. The planar illumination device according to claim 19, wherein each of the plurality of light sources is individually driven.

* * * * *